May 5, 1925.

G. W. NEWMAN

Re. 16,066

TUBE AND HINGE FOR TRANSFER BINDERS

Original Filed April 14, 1924

INVENTOR

George W. Newman

Charles Hills

BY

Atty

Reissued May 5, 1925. Re. 16,066

UNITED STATES PATENT OFFICE.

GEORGE W. NEWMAN, OF CHICAGO, ILLINOIS, ASSIGNOR TO WILSON-JONES LOOSE LEAF COMPANY, A CORPORATION OF MASSACHUSETTS.

TUBE AND HINGE FOR TRANSFER BINDERS.

Original No. 1,509,307, dated September 23, 1924, Serial No. 706,393, filed April 14, 1924. Application for reissue filed December 6, 1924. Serial No. 754,440.

*To all whom it may concern:*

Be it known that I, GEORGE W. NEWMAN, a citizen of the United States, and a resident of the city of Chicago, in the county of Cook and State of Illinois, have invented certain new and useful Improvements in a Tube and Hinge for Transfer Binders; and I do hereby declare that the following is a full, clear, and exact description of the same, reference being had to the accompanying drawings, and to the numerals of reference marked thereon, which form a part of this specification.

This invention relates to a loose leaf binder of that type, involving a pair of separable covers having clamping members hinged thereto with suitable leaf impaling posts.

These clamping members are usually stamped or formed from metal into oblong or tubular form with suitable hinge eyelets or bearings. It is, therefore, necessary to stamp or cut an irregular piece of metal from the original sheet thereby causing considerable waste. It is also desirable that these hinge bearings be nickel plated. Where the hinge bearings are integrally formed with the clamping members, they could not very well be separately nickel plated. Consequently, the whole clamping member had to be nickel plated. This method resulted in a great deal of waste; besides it proved costly.

This invention is designed to overcome the aforementioned defects in the provision of a structure wherein the clamping members and hinge bearings are separately formed, thereby avoiding the costly waste, and in which the hinge bearings may be nickel plated before they are attached to the clamping members, and in which the clamping members may be formed from a rectangular sheet of metal into a tubular or elliptical form, bringing the ends together and spot-welding or securing the hinge eyelets over the meeting edges.

The invention comprises the novel structure and combinations hereinafter described and more particularly pointed out and defined in the appended claims.

In the accompanying drawings which illustrate a preferred embodiment of this invention and in which similar reference numerals refer to similar features in the different views.

The illustrated binder to which my invention is applied consists of a pair of covers 1 having clamping members 2 hinged to the lower ends thereof; one of these clamping members has a pair of impaling posts that are adapted to be adjustably locked in apertures in the other clamping member.

According to this invention, each clamping member is formed from a substantially rectangular sheet of metal which is bent into flat tubular form, the ends of the metal sheet being brought together upon what may be termed the inner edge of the clamping member as indicated at 3.

Figure 1:
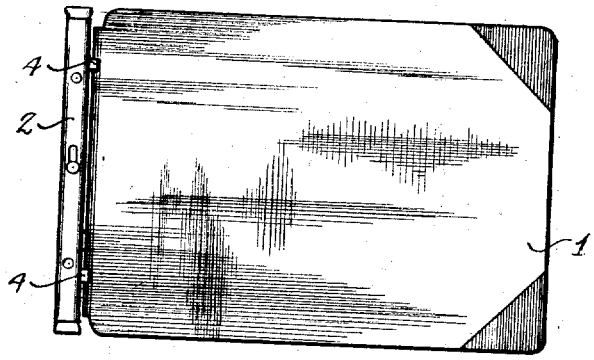
Figure 1 is a top plan view of a binder involving this invention.
Figure 2:
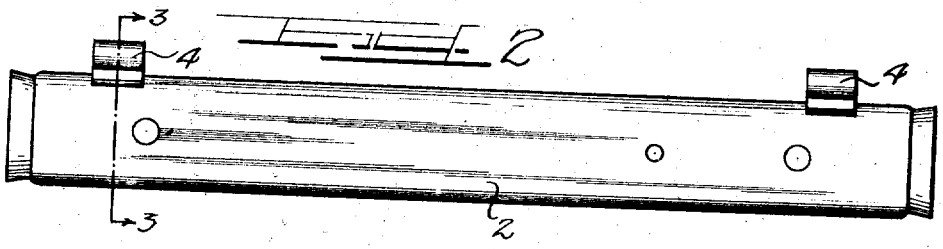
Figure 2 is an enlarged top plan view of one of the clamping members.
Figure 3:
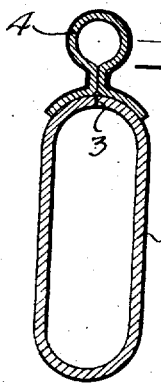
Figure 3 is an enlarged sectional view upon the line 3—3 of Figure 2.
Figure 4:
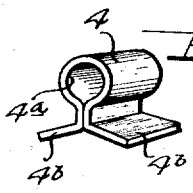
Figure 4 is a perspective view of one of the eyelet members.

The hinge bearings 4 are separately formed from a rectangular piece of metal which is bent to provide a cylindrical bearing or loop $4^a$ with oppositely extending attaching flanges $4^b$. These hinge bearings are separately nickel plated as shown in Figure 3 and spot welded at suitable points over the juncture of the ends of each clamping member exteriorly thereof as shown in Figures 2 and 3; the flanges $4^b$ being directed upon opposite sides of the joint and welded to the clamping member, thus holding the ends together against separation; the axes of the eyelets being substantially in the central longitudinal plane of the member, or in other words, the central plane which is parallel to the clamping surfaces, and the ends of the attaching flanges $4^b$ terminate within the planes of the clamping surfaces leaving the latter smooth. If desirable, the joint may be spot-welded directly under each hinge eyelet.

It will, of course, be understood that these hinge bearings or eyelets serve to hinge the covers to the clamping members by means of a wire rod as is well known in the art.

I am aware that numerous details of construction may be varied through a wide range without departing from the principles of this invention and I therefore do not purpose limiting the patent granted, otherwise than necessitated by the prior art.

I claim as my invention:

1. In a loose leaf binder, a hollow clamping member formed from a rectangular sheet of metal having its longitudinal edges brought into juxtaposition, and hinge bearings having oppositely extending attaching flanges welded exteriorly of said member over said edges.

2. A clamping member for a loose leaf binder, comprising an elliptical and hollow metal member having longitudinally extending meeting edges, and hinge eyelets united with said member over said meeting edges for the purpose set forth.

3. A clamping member for a loose leaf binder, comprising a substantially elliptical hollow metal member having longitudinally extending meeting edges, and hinge eyelets having means exteriorly spanning said meeting edges and welded to said member.

4. A clamping member for loose leaf binders, comprising a hollow elliptical metal member formed from a rectangular sheet of metal having meeting edges and hinge eyelets welded over said juncture of said meeting edges.

5. A clamping member for a loose leaf binder, comprising a hollow tubular element formed from a rectangular sheet of metal having its longitudinal edges in juxtaposition, and members attached exteriorly of said tubular element and extending over said edges for retaining the same together, said members forming a connection for a binder cover.

6. A clamping member for loose leaf binders, comprising a flattened tubular member, and hinge bearings having oppositely extending attaching flanges welded to the exterior of said member, said bearing members projecting in line with the major axis of the tubular member.

7. A clamping member for loose leaf binders, comprising a tubular member flattened upon its sides to afford a broad clamping surface, and hinge eyelets welded exteriorly of said member, the axis of said eyelets being substantially in the central longitudinal plane of said member, and said hinge eyelets embracing the edge of said member within the planes of its flattened sides.

8. A clamping member for loose leaf binders, comprising a tubular member flattened upon its sides to afford a broad clamping surface and hinge eyelets welded exteriorly of one edge of said member, the axis of said eyelets being substantially in the central longitudinal plane of said member, and said hinge eyelets having diverging attaching means embracing said member and terminating within the confines of the planes of its flatttened sides.

In witness whereof I have hereunto subscribed my name in the presence of two subscribing witnesses.

GEORGE W. NEWMAN.

Witnesses:

SPENCER W. GIBBS,
OSCAR HARTMANN.